Patented July 23, 1940

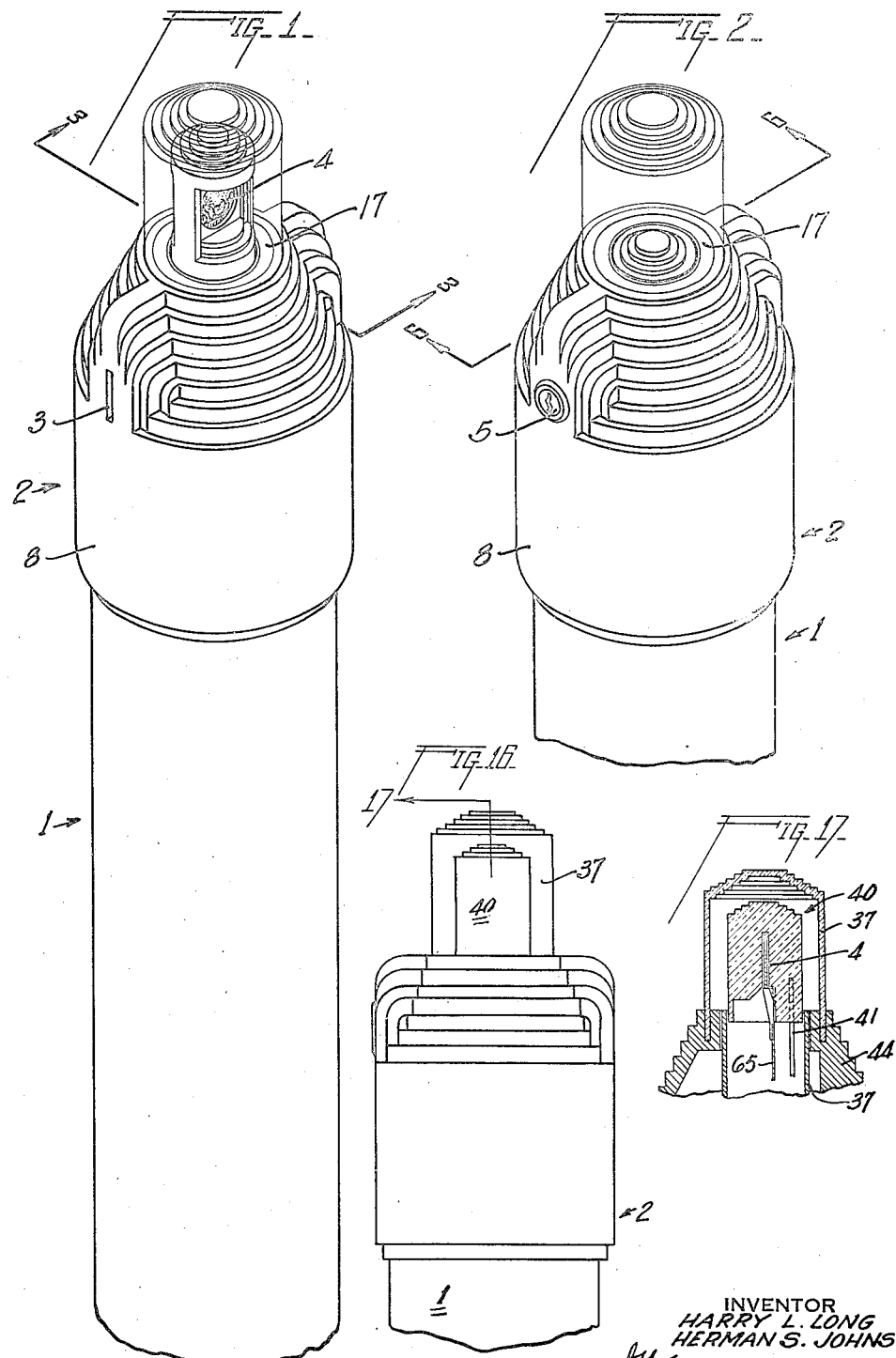

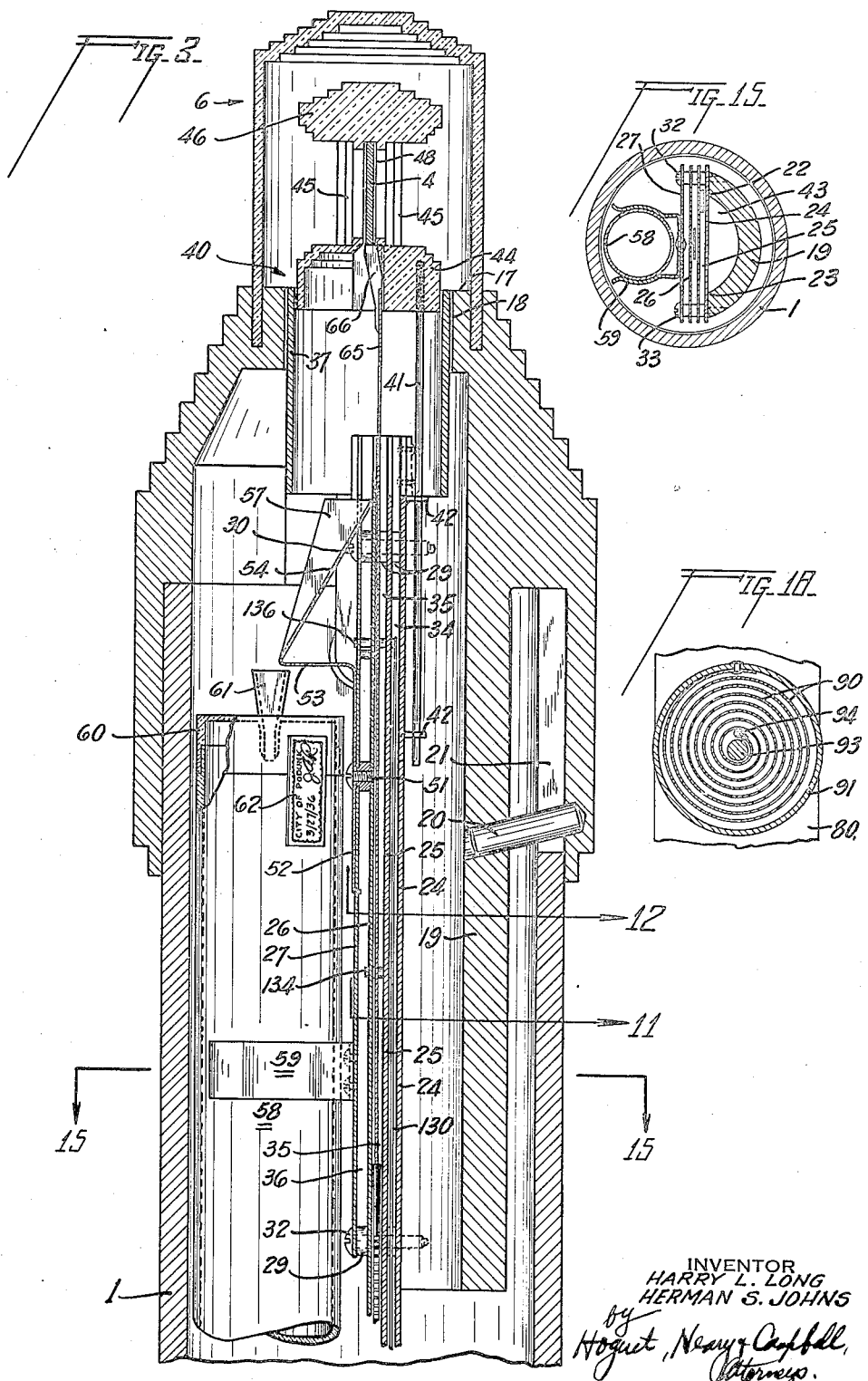

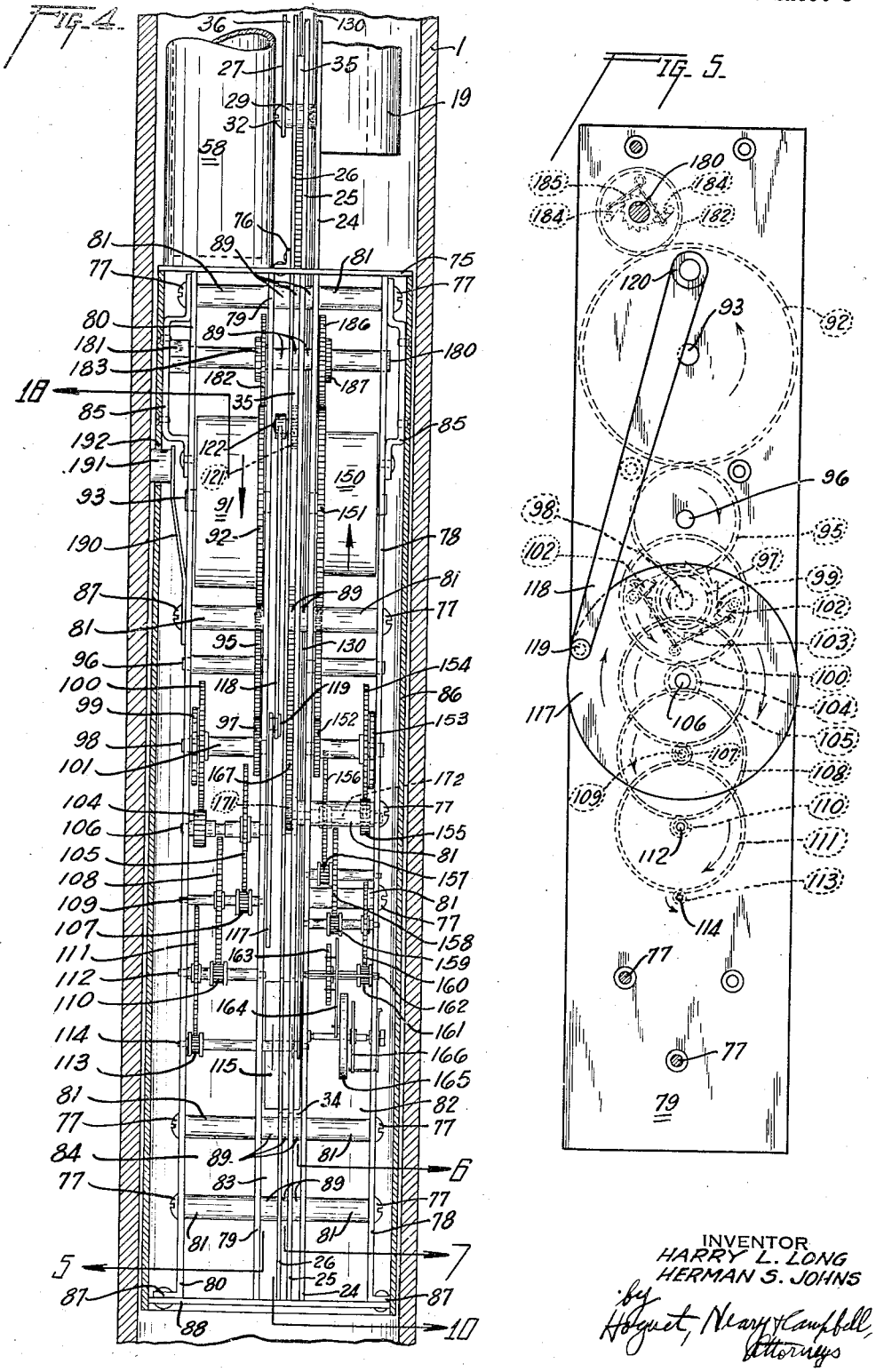

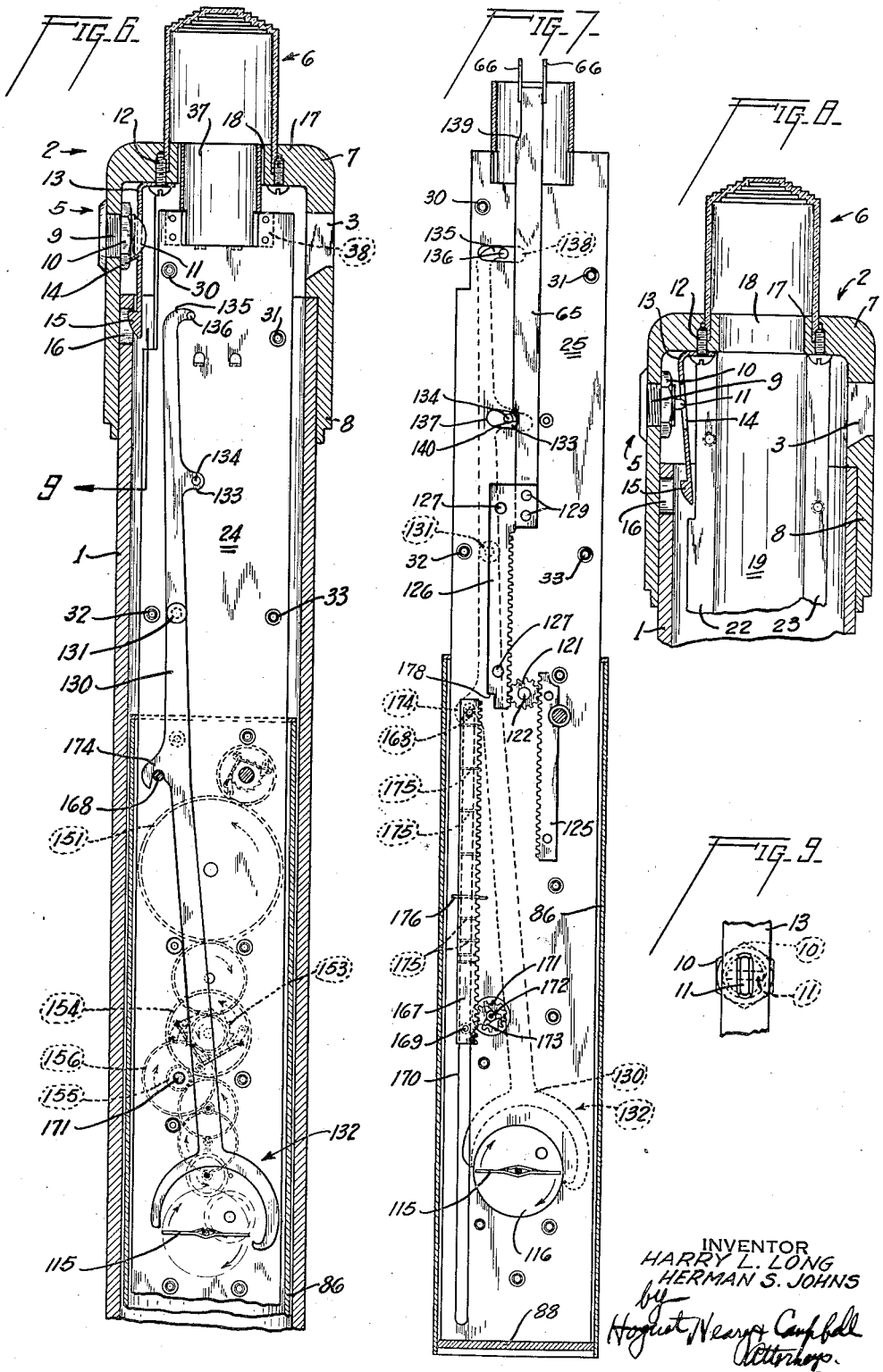

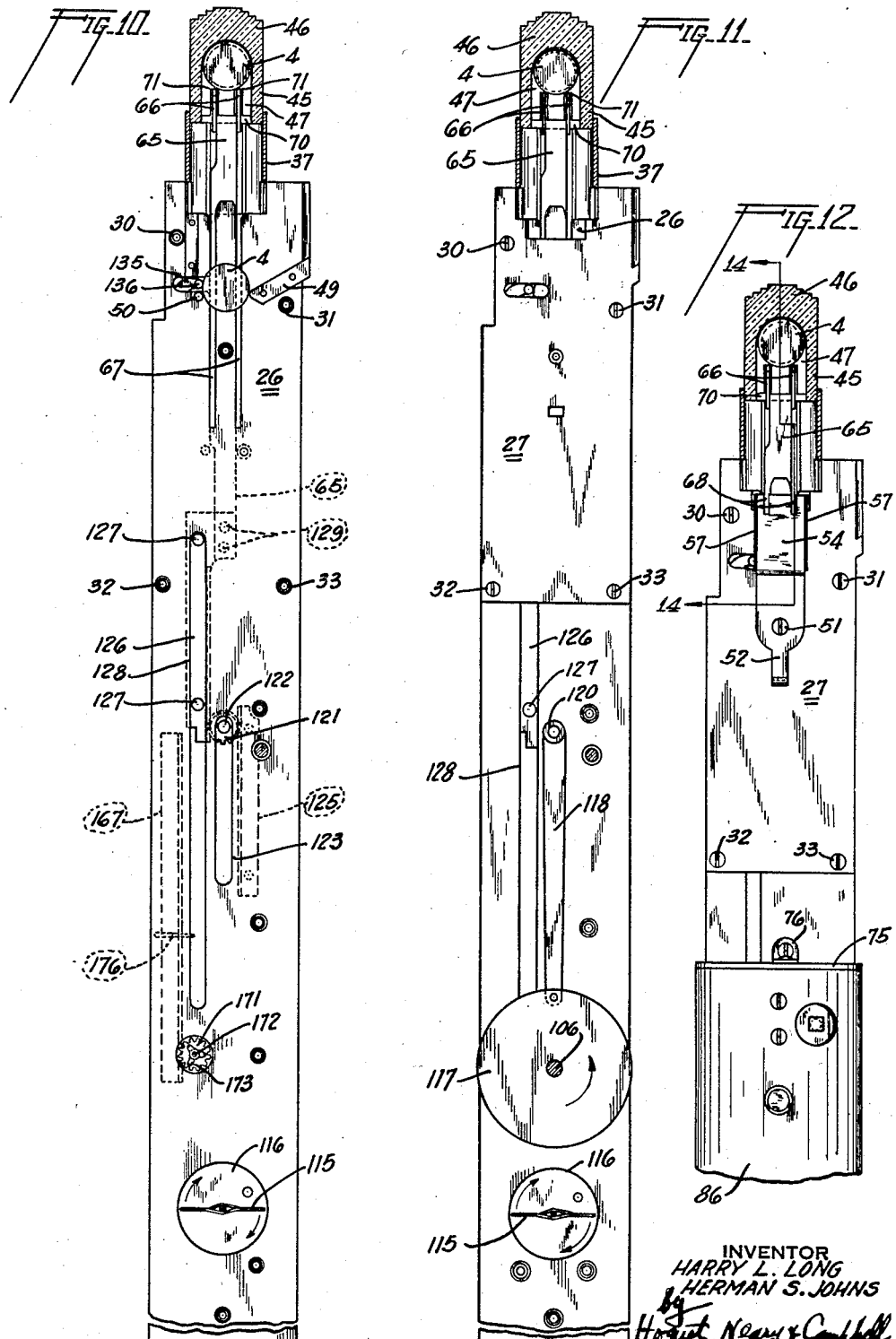

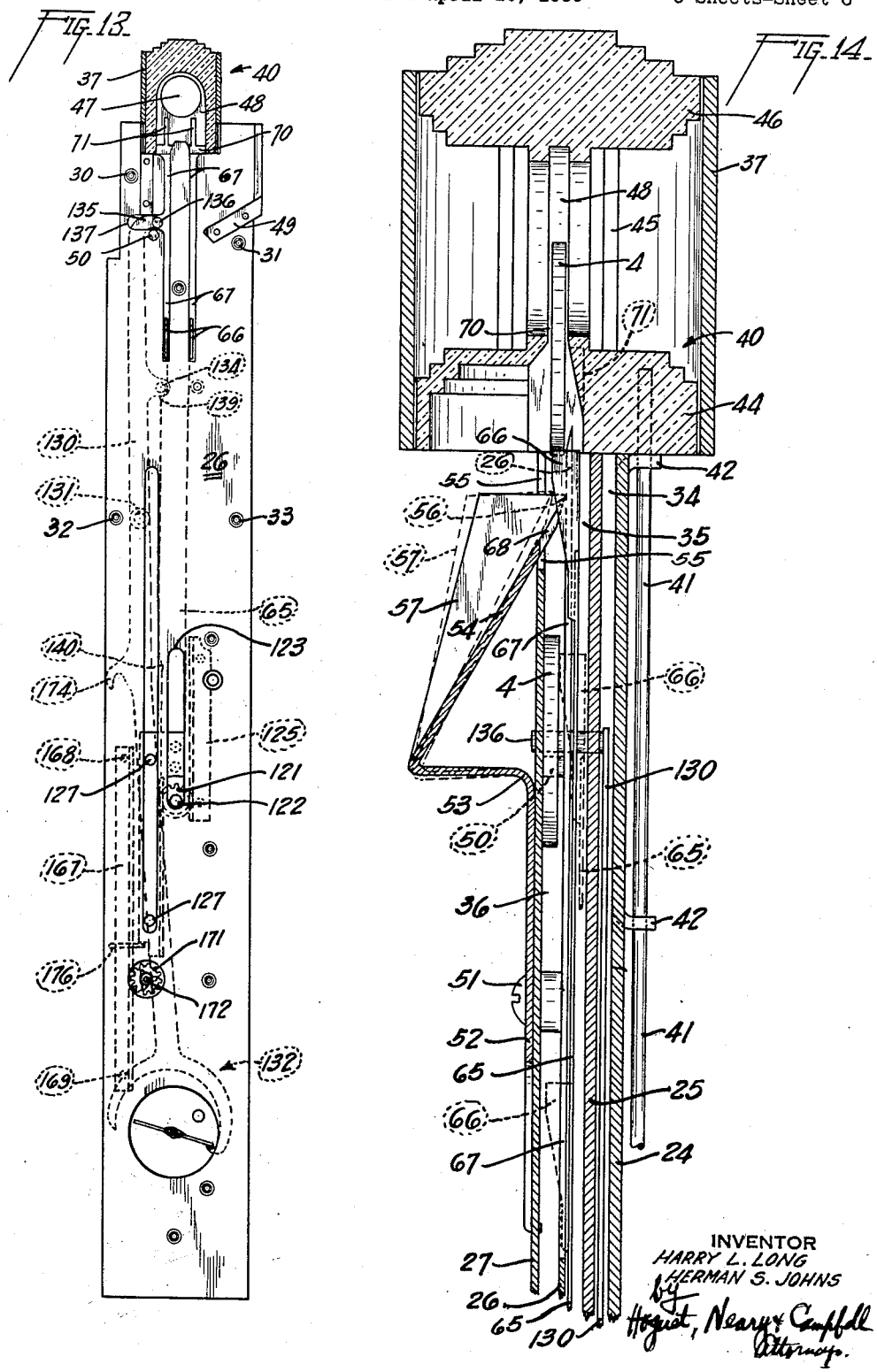

2,209,249

UNITED STATES PATENT OFFICE 2,209,249

AUTOMATIC COIN CONTROLLED PARKING DEVICE

Harry L. Long and Herman S. Johns, Oklahoma City, Okla., assignors, by direct and mesne assignments, of three-fourths to said Long and one-fourth to Walter M. Sturges, Oklahoma City, Okla.

Application April 16, 1936, Serial No. 74,772

14 Claims. (Cl. 194—20)

Our invention relates to devices for timing and collecting a revenue upon vehicle parking space.

The prime object of any parking meter is, of course, to relieve or prevent traffic congestion. One of the most common faults of previously designed parking devices is that an observer may ascertain at a glance how much, if any, unused parking time remains paid for after a preceding vehicle has moved out of the parking space. This has caused it to become common practice for persons seeking parking space to cruise about until they can find a parking space having considerable unused time remaining, in order that they may park for the remaining time without the deposit of a coin. The outcome of such practice is not only a partial failure of the devices to efficiently curtail traffic congestion, but also results in a failure to produce their legitimate amount of revenue. In some instances such devices actually increase traffic congestion by increasing the number of cruising vehicles. Observation has shown that many persons double park and leave their cars in order to ascertain the amount of unused parking time. This of course adds to traffic congestion.

Our device is so designed that it is impossible to determine the amount of unexpired parking time. Therefore, a person entering a parking space which has unused parking time will deposit his coin in order to preclude the possibility of the device showing him over-parked perhaps a minute after his back is turned.

The prime objects of our invention, therefore, are the prevention of cruising in order to find unused space which has previously been purchased; and, the collection of a maximum legitimate revenue.

Secondary objects of the invention include: simplicity in construction; visibility during parking time of the last inserted coin; visibility of the signal portion of the device from great distances, and from a position at any angle with relation to the device; the release of one coin and its replacement by another before the entire parking time has expired; removal of the complete internal mechanism as a unit; ease in replacement of parts; compactness; efficiency; and, durability.

The inventive idea, as limited by the appended claims, is susceptible of embodiment in forms other than that specifically shown in the accompanying six sheets of drawings which are made a part hereof.

In the drawings:

Figure 1 is a fragmentary perspective view of the device with the signal in a signalling position;

Fig. 2 is a similar view taken from a radial point lying one hundred and eighty degrees from that at which Fig. 1 is taken, the signal being shown in a non-signalling position;

Fig. 3 is a fragmentary elevational sectional view of the upper portion of the device taken substantially along the line 3—3 of Fig. 1, the signal being shown in a signalling position;

Fig. 4 is a view similar to Fig. 3, taken from a similar radial position, and showing the lower portion of the device, the driving mechanism being shown in elevation;

Fig. 5 is a side elevational view of the driving mechanism shown in Fig. 4 and looking toward the left hand from a plane indicated by the line 5 of Fig. 4;

Fig. 6 is an elevational sectional view taken substantially along the line 6—6 of Fig. 2, in a vertical plane represented by the line 6 of Fig. 4, the signal being removed;

Fig. 7 is a vertical sectional view looking toward the right hand from a plane represented by the line 7 of Fig. 4, the signal and the housing for the driving mechanism being removed;

Fig. 8 is a fragmentary elevational view of the upper portion of the housing as shown in Fig. 6, the signal and its operating mechanism being removed, and the locking mechanism being shown in an un-locked position;

Fig. 9 is a fragmentary elevational view of the inner face of the locking mechanism, taken substantially along a plane represented by the line 9 of Fig. 6, the full lines showing the lock in its locked position, and the dotted lines representing it in its unlocked position;

Fig. 10 is an elevational sectional view looking toward the right hand and taken substantially along a plane represented by the line 10 of Fig. 4;

Fig. 11 is a view similar to Fig. 10 but taken substantially along a plane represented by the line 11 of Fig. 3;

Fig. 12 is a view similar to Figs. 10 and 11 but taken substantially along a plane represented by the line 12 of Fig. 3, with the signal being shown in its non-signalling position and a fragment of the upper portion of the housing for the driving mechanism being shown in elevation;

Fig. 13 is a view similar to and taken substantially in the same plane as Fig. 10, with the signal being shown in a non-signalling position, and the actuating bar for the driving mechanism being shown in dotted lines;

Fig. 14 is a fragmentary elevational view taken substantially along the deformed line 14—14 of Fig. 12;

Fig. 15 is a sectional view taken substantially along the line 15—15 of Fig. 3;

Fig. 16 is a fragmentary elevational view showing a slightly different embodiment of the signal than that shown in Fig. 1;

Fig. 17 is a fragmentary sectional view of the signal taken substantially along the line 17—17 of Fig. 16; and, Fig. 18 is a sectional view taken substantially along the line 18 of Fig. 4.

One practical embodiment of the invention as illustrated in the drawings includes:

A substantially tubular post 1 which acts as a housing for a portion of the mechanism, and which at its lower end, not shown, is adapted to be rigidly mounted in a suitable base, such as a concrete slab, adjacent each parking space. Upon the upper end of the housing 1 is removably mounted a hollow head or signal housing 2 having at one side a coin receiving slot 3, (Figs. 1, 6 and 8), of a size barely sufficient to permit the passage of a disc-like token, slug, or a coin 4 of a certain diameter and thickness, and having at its other side a suitable key operated locking mechanism 5. The head 2 is equipped at its upper end with a hollow preferably cylindrical dome 6 of a suitable transparent material such as glass, which is cemented or otherwise rigidly attached in a permanent manner to the head. The upper end of the dome 6 is closed. The head 2 has an upper comparatively thick body portion 7 and therebelow a depending annular sleeve portion 8 adapted to surround and closely fit, in a removable manner, the upper end of the housing 1.

The locking mechanism 5 preferably includes a tubular body 9 held by a nut 10 within a lateral through bore in the sleeve portion 8 of the head 2. A key operated rotatable keeper having upon its inner end an arcuate surfaced shoe 11 is mounted within the body 9. Attached at one of its ends to the interior wall of the head 2 by a stud-bolt 12 is a strap-like depending metal spring 13 having a through slot 14 located in such a manner that the shoe 11 when in a vertical position registers therein. The spring is adapted to be forced away from the inner surface of the head by rotation of the shoe 11 into a horizontal position. The lower end of the spring 13 is provided with a latch 15 adapted to become engaged within a perforation 16 in the upper end of the housing 2 when the shoe 11 is in registration with the slot 14, and adapted to be forced out of such engagement upon partial rotation of the shoe.

The upper end 17 of the head 2 is equipped with a central through perforation 18. Around one side of the perforation and within the head is a substantially hemi-cylindrical depending element 19 integral with the nether or inner surface of the end 17 (Figs. 3 and 15). As may best be seen in Fig. 3, the element 19 and the sleeve portion 8 of the head are transversely and alignedly bored to receive a pin 20 which is pressed or driven into place from the interior of the head 2. The pin 20 registers within a vertical slot 21 cut downwardly from the upper end of the housing 1. The slot and pin act to prevent rotation of the head with relation to the body, and also insure proper circumferential alignment of the latch 15 with the perforation 16 and of the slot 14 in the spring 13 with the keeper 11.

The depending element 19 has two inner vertically extending edges 22 and 23 which lie in a single plane (Figs. 8 and 15). An assembly of parallel vertically extending spaced plates 24, 25, 26, and 27 which are preferably held together in their spaced relation by usual hollow rivets 29, are fastened to the edges 22 and 23 of the element 19 by a plurality of stud-bolts 30, 31, 32 and 33 which pass through the hollow rivets (Figs. 3, 6, 7, 8, 10, 11, 12, 13 and 15). The space lying between the plates 24 and 25 is represented by reference numeral 34, the space between the plates 25 and 26 by the numeral 35, and the space between the plates 26 and 27 by the numeral 36 (Figs. 4 and 14).

A tubular sleeve 37, having oppositely disposed outstanding ears 38, has its upper end disposed within the perforation 18 in the upper end 17 of the head 2; and the ears are bolted rigidly to plate 24 and the edges 22 and 23 of the element 19, as best illustrated in Figs. 3 and 6.

A substantially cylindrical plug or signal 40 rigidly mounted upon the upper end of laterally spaced guide rods 41 is reciprocatably positioned within the sleeve 37 and is adapted for upward movement into the transparent dome 6. The guide rods are slidably disposed in aligned perforations in spaced outwardly extending ears 42 carried by the outer face of the plate 24 and lying within an arcuate cavity 43 (Fig. 15) bounded by the plate 24 and the element 19. The signal and one of the guide rods may best be seen in Figs. 3 and 14.

The signal 40 preferably consists substantially of a bottom or base element 44, two oppositely disposed integral side strips 45, and a top 46 supported by and preferably integral with the upper ends of the side strips. A laterally extending through opening 47 is thus formed between the side strips and the top and base of the signal. The adjacent inner faces of the two side strips 45 are provided with vertical slots 48 of a width sufficient to barely receive the coin 4, and the slots are spaced from each other sufficiently and are aligned so that the coin may be inserted in the slots, after which it may be moved upwardly into a position in which it is visible through the opening 47. The slots 48 are in alinement with the space 36 between the two plates 26 and 27, and therefore a coin if moved upwardly from within the space 36, will pass into the slots (Figs. 3 and 14). The coin slot 3 (Figs. 1, 6 and 8) is so located in the head 2 that a coin inserted therein will pass into the space 36. A guide strip 49 rigidly attached to the plate 26 and lying within the space 36, is provided for co-acting with a pin 50 (Figs. 10 and 13) also carried by the plate 26, in limiting downward movement of the coin within the space 36.

Connected to the outer face of the plate 27 by a stud bolt or bolts 51, is a spring element 52. The lower portion of the element 52 lies flatly along the outer face of the plate 27 and at a vertical point adjacent the pin 50 is bent laterally as shown at 53. At the outer end of the lateral portion 53 the element 52 is bent at an angle and the portion 54 thereabove extends upwardly and inwardly through an opening 55 in the plate 27 into the previously described space 36, to a point at which its upper end 56 contacts the face of the plate 26. The coin 4 in entering the space 36 from the slot 3 passes beneath the upper end 56 of the element 52. Since the element 52 is formed of spring material, if the coin is forced upwardly in the space 36 it will force the upper end 56 of the element away from the plate 26 and will then pass upwardly into the grooves 48. If the coin is lowered from its position within the signal, the upper end of the element 52 acts to prevent its entry into the space 36, and the coin travels downwardly through the opening 55 in the plate 27 and along the outer face of the portion 54 of the element 52. The outer face of the portion 54 of the element 52 is provided at each side edge with an upstanding wall 57 which confines the downward travel of the coin to a path lying along the portion 54.

As may best be seen in Figs. 3 and 15, a coin container 58 is removably held within the lower portion of the head 2 and within the upper portion of the housing 1 by a spring bracket 59 which is rigidly mounted upon the outer face of the plate 27. The container 58 has a removable lid 60 having an upstanding coin receiving chute 61 which lies below and in alignment with the portion 54 of the element 52 and which is adapted to receive downwardly traveling coins therefrom. The chute projects inwardly past the top of the lid and its inner end has a passage barely large enough to permit the coin 4 to enter the container. This precludes the likelihood of a person making collections from the device shaking any of the coins out of the container through the chute. A gummed seal 62 may be used to seal the lid to the container so that a collector will merely replace a filled or partially filled container with an empty one.

In the description hereinabove no mechanism has been described for selectively raising and lowering either the coin or the signal. Such mechanism will next be described.

Within the space 35 lying between the plates 25 and 26 is provided a vertically slidable strip 65 (Figs. 3, 7, 10, 11, 12, 13, 14 and 15) to the upper end of which are rigidly attached two spaced blades 66 which project through longitudinal slots 67 in the plate 26 and extend into the space 36 a sufficient distance to contact and raise or lower any coin which might be supported within the space 36. The upper end of the portion 54 of the spring element 52 is provided with a pair of spaced vertical slots one of which is indicated by the reference numeral 68 (Fig. 14) which permit vertical reciprocation of the blades 66 therepast without movement of the upper end 56 of the element 52. The strip 65 is preferably made of spring steel and is so formed that its inherent tendency is to normally hold its upper end as far as possible away from the plate 25 and toward the plate 26. This insures engagement of the blades 66 beneath the lower periphery of a coin 4 when the coin is supported within the space 36 by the previously described guide strip 49 and the pin 50, and also permits the strip 65 to be sprung toward the plate 25 in order that the blades 66 may move downwardly past a coin supported as above described within the space 36. This movement is best illustrated in dotted lines in Fig. 14.

The base element 44 of the signal 40 is provided with a through passage 70 of a size sufficient to permit the passage therethrough of the coin 4, and at one side of the passage the base is equipped with two spaced grooves 71 each adapted to receive one of the blades 66 (Figs. 10, 11, 12, 13 and 14). Each of the grooves 71 has an abruptly closed upper end which is contacted by one of the blades 66 in its upward travel, and therefore the signal is forced to travel upwardly when the strip 65 is moved to the upper end of its stroke. The signal 40 is also lowered when the strip 65 is lowered.

Description of the operation of the mechanism thus far described hereinabove will next be given, it being necessary to first concede that a mechanism, which will be fully described hereinbelow, may be provided by which the strip 65 may be caused to move upwardly upon the insertion of a coin 4, and may be caused to drop instantly after a predetermined period of time has elapsed, and during which time the strip has been held at the upper end of its stroke. It will also be necessary to concede that a mechanism may be provided wherein the insertion of a coin during the period in which the strip 65 is held at the upper end of its stroke will cause the strip to drop and after reaching the bottom of its stroke to again be raised to the upper end of its throw and be held there for another period of time.

When a coin 4 is inserted within the slot 3 in the head 2, it passes into the space 36 and thence passes downwardly along the guide strip 49 to a point where it is supported between the pin 50 and the lower end of the strip 49. Consider that at the time of the insertion of the coin, the spring strip 65 is at the lower end of its permitted travel, and therefore the upper ends of the blades 66 are lying below the coin, also consider that in reaching the pin 50, a power mechanism is placed in operation by the coin to drive the strip 65 upwardly.

The upper ends of the blades 66 will engage the bottom periphery of the coin 4 and will force the coin upwardly into the grooves 48 in the signal 40. As the coin passes the upper end 56 of the spring element 52, said end will be forced outwardly by contact with the coin, and the coin will therefore be permitted to pass by the end 56 and to enter said grooves 48. As the blades 66 reach the upper closed ends of the grooves 71, the signal will be engaged and will be forced to move upwardly with the strip 65. At the instant of contact between the blades and the closed ends of the grooves 71, the coin will reach a position within the signal at which it may be fully seen through the opening 47 in the signal. The mechanism for driving the strip 65 upwardly is so arranged that the strip is held in its raised position until the lapse of a predetermined period of time, or until another coin is inserted, at either of which times the strip 65 will be dropped or driven in a substantially instantaneous manner to the lower end of its throw. In either event, the coin which was being held within the signal will when lowered, contact the upper end 56 of the spring element 52 and will be forced thereby out of engagement with the blades 66, at which time it will gravitate along the portion 54 of the element 52 and will be deposited through the chute 61 into the container 58.

The driving mechanism is so controlled that if the strip reaches the lower end of its throw before a second coin has been inserted into the device, the strip will remain in its lowered position until a second coin is deposited. However, if the second coin is inserted at a time the signal and a previously inserted coin are in raised positions, the second coin in reaching the pin 50 and the lower end of the guide strip 49, will actuate the driving mechanism to lower the strip 65 in the manner above described. In this instance the strip 65 in its downward travel will be moved by the second coin coming in contact with the blades 66, away from the plate 26 so that the blades may pass the coin in their downward travel. When the strip 65 has reached the lower end of its throw, its movement will be reversed and the second coin will be raised into the signal and the signal will be raised as above described with relation to the first coin.

The driving mechanism and its control apparatus will next be described. The driving mechanism, as may best be seen in Figs. 4, 5 and 6, consists substantially of the following described structure:

The previously described plates 24, 25 and 26 extend downwardly within the housing 1 to a point lying adjacent the bottom of Fig. 4. The lower end of the plate 27 terminates slightly below the lowermost one of the stud-bolts 32 as shown in the upper portion of Fig. 4. A horizontally disposed plate 75 is firmly attached to the plate 26 by an L-shaped bracket or brackets 76 and the plate has a central substantially rectangular aperture, not shown, through which the plates 24, 25 and 26 extend. The horizontal plate 75 acts to assist the previously described spring bracket 59 in supporting the coin container 58, and also tends to protect the mechanism therebelow from falling particles of rust, dust, and the like.

Attached to the portions of the plates 24, 25 and 26 lying below the horizontal plate 75 by a plurality of suitable bolts 77 are three plates 78, 79 and 80 which lie parallel to the plates 24, 25 and 26 and which are spaced therefrom by tubular spacers or hollow rivets 81. The space lying between the plate 78 and the plate 24 is represented by the reference numeral 82, that lying between the plates 26 and 79 is indicated by the numeral 83, and the space between the plates 79 and 80 is shown as 84 (Fig. 4). Oppositely disposed brackets 85 are rigidly attached to the outer faces of the plates 78 and 80, and the brackets are in turn connected rigidly to the inner wall of a tubular sleeve 86. The horizontal plate 75 contacts the upper ends of the sleeve 86 and the plates 78, 79 and 80. The lower ends of the plates 78 and 80 are equipped with outwardly extending flanges 87 which are firmly attached to a disc-like horizontal bottom plate 88 which fits snugly within but is not attached to the bottom of the sleeve 87. Around the various bolts 77 and between the plates 24, 25 and 26 are provided a plurality of spacers 89 which act to hold the plates rigidly parallel.

Lying between the plates 79 and 80 and within the space 84 is a spring driven power unit adapted to raise and lower the previously described spring strip 65 for raising and lowering the coin 4 and the signal 40. The power unit consists substantially of a convolute spring 90 (Fig. 18), within a hollow cylindrical spring housing 91. The end of the housing lying adjacent the plate 80 is open and its opposite end which is also open is rigidly attached to the face of a driving pinion 92. The pinion 92 is rotatably mounted upon a stationary axle 93 secured at its ends to the plates 79 and 80. As best seen in Fig. 18, the inner end of the spring 90 is secured to a pin 94 carried by the inner face of the plate 80 and lying adjacent the axle 93. The convolutions of the spring surround the axle 93 and the outer end thereof is riveted or otherwise rigidly attached to the inner wall of the spring housing. The spring is so disposed that it is adapted after being wound, to drive the pinion and housing in a clockwise direction, looking toward the plate 79 from the plate 80, and as indicated by arrows in Figs. 4 and 5.

A speed increasing gear train is driven by the drive pinion 92 and consists substantially of the following described elements: a gear 95 meshing with the drive pinion 92 and rotatable upon a stationary shaft 96 carried by the plates 79 and 80; a smaller gear 97 meshing with the gear 95 and rigidly connected to a shaft 98 adjacent one end thereof, the shaft 98 being journaled for rotation in the plates 79 and 80, and adjacent its opposite end having a rigidly mounted ratchet gear 99; a larger gear 100 rotatable upon the shaft 98 and held in place adjacent the inner face of the ratchet gear 99 by a tubular spacer 101; oppositely disposed pivotally mounted dogs 102 (Fig. 5) and a spring 103, the dogs and spring being carried by the outer face of the gear 100 with the spring acting to urge the dogs into engagement with the teeth of the ratchet gear 99 so that rotation of the ratchet gear in a clockwise direction will cause rotation of the gear 100 in a similar direction, but permitting anti-clockwise rotation of the ratchet gear without its imparting rotative movement to the gear 100; a small gear 104, meshing with the gear 100, and a larger gear 105, the gears 104 and 105 being rigidly mounted upon a rotatable shaft 106 journaled in the plates 79 and 80; a small gear 107, meshing with the gear 105, and a larger gear 108, both rigidly mounted upon a rotatable shaft 109 journaled in the plates 79 and 80; a small gear 110, meshing with the gear 108, and a larger gear 111, both rigidly mounted upon a rotatable shaft 112 journaled in the plates 79 and 80; and, a small gear 113 meshing with the gear 111 and rigidly mounted upon a rotatable shaft 114 journaled at one end in the plate 80, passing through the plates 79, 26 and 25, and being journaled at its other end in the plate 24.

The portion of the shaft 114 lying between the plates 79 and 24 receives a rigidly attached governor fan 115, and a portion of each of the plates 25 and 26 surrounding the shaft 114 is cut away, as indicated in Fig. 7 by the reference numeral 116, to permit free rotation of the fan with the shaft 114. Air resistance governs the speed of rotation of the fan, and since the gear train increases the comparative speed of rotation of the shaft 114 over the rotative speed of the driving gear 92, it also decreases the rotative power of the shaft 114. Consequently operation of the entire gear train may be stopped by a slight touch upon the fan 115. As will be more fully described hereinbelow, automatic control of movement of the fan is utilized as a medium for raising and lowering the signal 40.

Lying within the space 83 adjacent the inner face of the plate 79, and rigidly connected to the inner end of the previously described shaft 106, is a rotatable disc 117. A side rod or link 118 has its lower end pivotally connected by a pivot pin 119 to the inner face of the disc 117 adjacent the periphery thereof. The upper end of the link 118 is provided with a transversely perforated enlarged boss 120. The boss 120 is practically as thick transversely as the width of the space 83 but has a loose working fit with the plates 26 and 79. A floating pinion 121 rigidly connected to a short pin or shaft 122 (Figs. 4, 7, 10 and 13), which extends through a longitudinal slot 123 in the plate 26, is disposed within the space 35 between the plates 25 and 26, and the pin is rotatably journaled in the tranverse bore of the boss 120. Consequently, rotation of the disc 117 causes vertical reciprocal movement of the pinion 121.

Referring now more particularly to Fig. 7, and secondarily to Figs. 10 and 13, structure will be described wherein vertical reciprocation of the pinion 121 raises and lowers the previously described spring strip 65.

Lying within the space 35 parallel with and spaced slightly from the slot 123, and rigidly attached to the plate 25 is a stationary toothed rack 125, the teeth of which are at all times held in engagement with the floating pinion 121 by the confining effect of the slot 123 upon the pin 122. A vertically reciprocatable rack 126 is slidably mounted within the space 35 and its upward and downward movement is limited by two spaced outstanding guide pins 127 which are slidably received within a longitudinal through slot 128 in the plate 26. The pins 127 and the sides of the slot 128 act to hold the toothed edge of the rack 126 in positive engagement with the teeth of the pinion 121. As the pinion 121 is forced by the link 118 either upwardly or downwardly, it is forced by the stationary rack 125 to rotate. Simultaneous rotation and vertical movement of the pinion 121 causes movement of the rack 126 in a similar direction at twice the speed at which the pinion 121 is moving vertically. Consequently, the rack 126 travels a distance equal to twice the vertical stroke of the upper end of the link 118. The upper end of the rack 126 is attached firmly to the lower end of the strip 65 by rivets or bolts 129. As long as the driving mechanism, which is driven by the spring 90, is in operation, the strip 65 will continuously reciprocate. Since, in order to obtain proper operation of the signal, it is necesesary to periodically hold the strip either at the upper or lower end of its stroke, it is necesary that the driving mechanism be periodically stopped and started. The mechanical structure by which this result is obtained will next be described.

Refer now particularly to Figs. 3, 4, 6, 7, 13 and 14, in which the reference numeral 130 represents an actuating bar which is pivotally mounted intermediate its ends upon a shaft 131 supported at its ends by the plates 24 and 25. The bar 130 is rockably positioned within the space 34, and has at its lower end an arcuate fork 132 which partially surrounds the fan 115 in a manner best illustrated in Figs. 6 and 7. Above the pin 131, one edge of the actuating bar is formed with a projection 133 which rigidly supports a laterally extendng pin 134. The upper end of the bar 130 has a second projection 135 extending in a similar direction and having a rigidly supported pin 136 extending laterally thereto. The plates 25, 26 and 27 are all provided with two aligned series 137 and 138 of slots through which the respective pins 134 and 136 extend from the space 34 through the spaces 35 and 36, and which permit a rocking movement of the bar 130 upon its pivot pin 131. The slots 137 and 138 are best illustrated in Figs. 7 and 13. Intermediate its ends, the strip 65 is reduced in width at two vertically spaced shoulders 139 and 140 (Figs. 7 and 13), and the portion lying between these two shoulders is therefore of greater width than the remainder of the strip. The uppermost shoulder 139, is so located vertically that when the strip 65 is at the lower end of its stroke the shoulder lies below the pin 134, and the upper end of the bar 130 may therefore move toward the strip sufficiently to permit the engagement of one of the tines of the fork 132 with the fan 115 thus preventing rotation of the fan. The bar 130 is so balanced upon its pivot pin 131 that its normal position is one in which the fan is held by the fork against rotation. Therefore, when the strip 65 reaches the lowermost end of its stroke, the fan is stopped in its rotation.

The wide portion of the strip 65 is of such a width that, during either upward or downward movement of the strip, it comes in contact with the pin 134, and when such contact is made, the fork 132 is held clear of the fan 115 which is therefore permitted to rotate. The shoulder 140 is so located upon the strip 65 that when the strip is at the upper end of its stroke, the shoulder is above the pin 134, and consequently the bar 130 is free to resume its normal position which causes the fork 132 to stop rotation of the fan 115.

As clearly shown in Figs. 10 and 13, when the actuating bar 130 is in its normal position as shown in Fig. 13, the pin 136 lies slightly nearer the lower end of the guide strip 49 than is the stationary pin 50. Consequently, when a coin is inserted within the slot 3 and moves downwardly along the guide strip, it meets the pin 136 and forces the upper end of the actuating bar 130 away from the guide strip before it comes to rest upon the pin 50 (Fig. 10). This movement of the actuating bar releases the fan to rotation and permits the power mechanism to operate.

Operation of the actuating bar 130 and its coacting mechanism may be described substantially as follows:

It has previously been described hereinabove how the power mechanism will continuously reciprocate the spring strip 65 as long as the mechanism is in operation. For the sake of description, consider first that the strip 65 is at the lower end of its stroke. The shoulder 139 is therefore below the pin 134 carried by the actuating bar 130, and the actuating bar is in its normal position (Fig. 13) which prevents rotation of the fan 115 and consequently the power mechanism is idle.

A coin inserted within the slot 3 passes downwardly along the guide strip 49 toward the stationary pin 50, and in its travel the coin contacts the pin 136 and forces the upper end of the actuating bar away from the lower end of the guide strip. This movement of the actuating bar causes the fork 132 to release its contact with the fan 115 which permits the power mechanism to drive the spring strip upwardly to engage and raise the coin and signal 40 as previously described hereinabove. During upward travel of the spring strip 65, and before the upper ends of the blades 66 have contacted the coin, the wider portion of the strip 65 contacts the pin 134 and holds the actuating bar in such a position as to permit continued operation of the power mechanism after the coin has been raised by the blades 66. While the wider portion of the strip 65 contacts the pin 134, the actuating bar 130 is held stationary until the lower shoulder 140 reaches a vertical position above the pin 134, at which time the actuating bar is permitted to resume its normal position and stop rotation of the fan 115. The spring strip 65, coin 4 and signal 40 are then at the upper ends of their permitted travel and are held in this position as long as the actuating bar remains in its normal position and the power mechanism therefore remains idle.

Should a second coin now be inserted, it will move the upper end of the actuating bar as previously described, causing release of the fan 115. The strip 65 will then be conveyed by the power mechanism to the lower end of its stroke, but since the coin is holding the upper end of the actuating bar against movement, the power mechanism will continue to operate and will again raise the strip 65 to the upper end of its travel, and the shoulder 140 will again reach a point above the pin 134 before the actuating bar is permitted to resume its normal position and stop rotation of the fan 115. The second upward movement of the strip 65 will of course raise the second coin and will re-raise the signal 40.

In the description hereinabove no structure has been disclosed whereby the strip 65 may be lowered from its raised position when a predetermined period of time has elapsed after it has been raised. A description of this structure will now be given.

Referring now more particularly to Fig. 4, wherein is shown a second power mechanism located within the space 82 between the plates 24 and 78. This second mechanism is in fact a suitably designed clock works, and consists substantially of a spring housing 150 having a rigidly attached drive gear 151. The mechanism for driving the previously described housing 91 and drive gear 92 is typical of that for driving the clock drive gear 151 and the housing 150 except that the gear 151 is driven by its spring in an opposite direction from the direction in which the gear 92 is driven. The gear 151 drives a gear 152 and a ratchet gear 153 similar respectively to gears 97 and 99 of the previously described power mechanism. The ratchet gear 153 through its dogs drives gears 154, 155, 156, 157, 158, 159 and 160 which are similar except as to gear ratio to the respective gears 100, 104, 105, 107, 108, 110 and 111 of the power mechanism. The gear 160 drives a gear 161 rigidly mounted upon a shaft 162 which also carries a rigidly mounted escape wheel 163. A usual escapement lever 164, balance wheel 165, and hair spring 166 co-act in a usual manner to govern the speed of rotation of the entire clock mechanism.

Reciprocatably mounted within the space 35 between the plates 25 and 26 is a toothed rack 167 (Figs. 4, 7, 10 and 13). The rack has two spaced perpendicular guide pins 168 and 169 which extend through a longitudinal slot 170 in the plate 25 and enter the space 34 in which the actuating bar 130 operates. The rack is driven in an upward direction by a gear 171 mounted within the space 35 upon a shaft 172 (Fig. 4), which is the shaft upon which the gears 155 and 156 of the clock mechanism are mounted. The gear 171 is held in frictional engagement with the shaft 172 by a resilient metal spider 173 which is rigidly connected to the shaft and the legs of which press against the face of the gear with sufficient force to raise the rack 167. The uppermost pin, 168, of the rack is located in such a manner that when it approaches the uppermost end of its throw, it engages a hook 174 carried by the actuating bar 130 and moves the lower end of the bar to disengage the fork 132 from the fan 115, thus starting operation of the power mechanism. It will be understood, of course, that the two reciprocating racks 126 and 167 are both within the space 35, and lie in a common plane. The clock mechanism is in continuous operation and consequently the gear 171 is continuously forcing the rack 167 in an upward direction. The rack 167 is moved from the upper to the lower end of its throw against the frictional engagement of the spider 173 with the gear 171 in the following described manner.

As best shown in Fig. 7, the rack 167 is provided with a plurality of spaced bores 175 which pass edgewise therethrough and each of which is adapted to receive a tapered pin 176 which is of sufficient length to project through the rack and into the path of the lower end 178 of the first rack 126. The pin 176 may be selectively positioned in any one of the bores 175 and its vertical location determines the distance in a downward direction which the rack 167 will be moved by the contact of the rack 126 with the pin 176.

The bores 175 are spaced in the rack 167 in direct proportion to the time required for the clock mechanism to raise the rack a given distance. For instance, if the pin were placed in the lowermost of the bores the rack 167 would be lowered only partially upon engagement of the pin 176 by the lower end 178 of the rack 126, thus requiring only fifteen minutes for the clock mechanism to drive the rack upwardly a sufficient distance for the pin 168 to engage the hook 174 and cause the actuating bar 130 to release the power mechanism to operation, thus again lowering the racks 126 and 167. On the other hand, three hours would be required for the same operation if the pin 176 were inserted in the uppermost one of the bores 175. The bores may of course be spaced to accommodate any desired periods of time.

No structure has been described hereinabove for winding the spring 90, which drives the drive gear 92 of the power mechanism, nor for winding the similar spring which drives the gear 151 of the clock mechanism. Such structure will next be described.

Refer more particularly to Figs. 4, 5 and 6, wherein:

The reference numeral 180 represents a horizontally disposed shaft passing through and journaled for rotation in all of the plates 78, 24, 25, 26 and 79, and having upon one end a polyhedronal key post 181 for receiving a key, not shown, whereby the shaft may be manually rotated in both directions. Within the space 84, meshing with the gear 92, and rotatable upon the shaft 180, is a winding gear 182. Keyed or otherwise rigidly connected to the shaft 180 adjacent the outer face of the gear 182 is a ratchet gear 183. The outer face of the gear 182 is equipped with a pair of pivotally mounted dogs 184 which are urged by a spring 185 into engagement with the teeth of the ratchet gear whereby rotation of the shaft 180 and ratchet gear 183 in a clockwise direction will impart similar rotation to the gear 182, and whereby rotation thereof in an opposite direction will permit the ratchet gear to turn without rotating the gear 182.

Within the space 82 the shaft 180 is equipped with a winding gear 186 meshing with the clock gear 151 and rotatable upon the shaft. A ratchet gear 187 is keyed to the shaft 180 adjacent the outer face of the gear 186, and the ratchet gear is adapted through dogs, not shown, to drive the winding gear 186 in a clockwise direction when the shaft 180 is similarly rotated. The dogs permit rotation of the gear 186 in an anti-clockwise direction without imparting movement to the ratchet gear 187.

In winding the two power springs, the shaft 180 may be alternately turned in clockwise and anti-clockwise directions, which will energize both springs.

In order to insert the winding key upon the post 181, it is first necessary to unlock the housing 2 from the post 1 and raise the entire mechanism a distance sufficient to bring the socket above the upper end of the post 1. In order to hold the mechanism in this raised position, the outer face of the plate 80 (Fig. 4) is provided with a spring element 190 firmly attached at its lower end to the plate and the upper end of which has a latch 191 passing through a lateral perforation 192 in the sleeve 86. When the mechanism is raised sufficiently, the latch may engage the upper end of the post 1 and hold the mechanism in such position during the winding operation.

It is pointed out that although the power mechanism positively propels the strip 65 from its upper to its lower position, the signal 40 merely gravitates downwardly, and the power mechanism governs the speed at which the signal may gravitate. It is intended that the signal be vividly colored, except its upper end, so that it may be observed from considerable distances.

In Figs. 16 and 17 is illustrated an embodiment of the signal 40 in which the openings 47 for viewing the coin have been eliminated, the signal being solid except for the coin receiving slot. Thus, while we have shown and described two forms of our invention we are fully aware that many modifications are therefore possible; that the structure of the signal may be radically changed and that the mechanism may also be changed in many respects without departing from the spirit of the invention. For this reason it should be understood that the forms of the invention herein illustrated and described are intended to be illustrative of the invention and are not intended to limit the scope thereof.

We claim:

1. In a coin actuated signal, the combination with a driving mechanism and a signalling mechanism actuatable thereby to perform a signalling operation, of means for controlling operation of the driving mechanism, including: a pivotally mounted lever normally holding the driving mechanism against operation, a housing including means for receiving a coin adjacent said lever, said lever being actuatable by a coin received in said housing to a position to release said driving mechanism for actuation of said signalling mechanism, and said driving mechanism including an element operable to maintain said lever in its releasing position until said signalling mechanism has performed said signalling operation.

2. In a parking meter, a housing having a transparent portion, a visible signal movable into and out of an observable position adjacent said transparent portion, means including a source of power for moving said signal to said observable position, control means normally biased to a position to restrain operation of said signal moving means, said control means being actuatable by a coin to move mementarily from said biased position to a position to permit said signal moving means to move said signal to said observable position, said signal moving means including means operable to maintain said control means out of said biased position until said signal reaches said observable position, whereupon said control means is permitted to return to said biased position and hold said signal in said observable position, a timing element, and means associated with said timing element operable to move said control means from said biased position to permit said signal moving means to effect removal of said signal from said observable position after the lapse of a predetermined period of time.

3. The organization described in claim 2, wherein said signal moving means includes means for carrying the coin into said observable position with the signal.

4. The organization described in claim 2, and means for adjusting the setting of said timing element whereby the signalling period may be varied.

5. In a parking meter, a housing having a transparent portion, a signal movable into and out of observable position adjacent said transparent portion, driving means including a source of power operable to effect movement of the signal into and out of said observable position, control means biased to a position to restrain movement of said driving means, said control means being movable from said biased position by a coin to permit said driving means to move said signal into said observable position, said driving means including means to maintain said control means out of said biased position until said signal reaches said observable position, timing means initiatable by said power means upon moving said signal into said observable position, and said timing means being operable upon the expiration of a predetermined period of time to move said control means from said biased position to permit said power means to effect movement of said signal out of said observable position.

6. In a parking meter, a signal, power means including a reciprocatable member for moving said signal into signalling and non-signalling positions, control means biased to a position to restrain operation of said power means, said control means being movable from said biased position by a coin to permit said power means to operate and move said signal, and said member being provided with a surface adapted to engage and hold said control means out of said biased position until said signal reaches said signalling or non-signalling position, the surface of said member operating thereafter to permit said control means to return to said biased position so as to cause said power means to hold said signal stationary.

7. In a parking meter, a signal, power means having a reciprocatable member for moving said signal into and out of signalling position, a timing element, said member being arranged to reset said element to initial position each time said member moves the signal out of signalling position, and to initiate a new timing period upon moving said signal into signalling position, control means biased to a position to restrain operation of said power means, said control means being movable from said biased position by a coin to permit said power means to operate and move said signal into signalling position, and said member having a surface adapted to hold said control means out of said biased position until said signal reaches signalling position, and said timing element having means operable upon the expiration of a predetermined period of time to move said control means from said biased position to permit said power means to move said signal out of signalling position, the surface of said member being adapted to hold said control means out of said biased position until said signal is removed from signalling position.

8. In a parking meter, a signal having a recess for receiving and exposing a coin for observation during a signalling operation, power means having a reciprocatable member for moving said signal into and out of signalling position, control means biased to a position to restrain operation of said power means, said control means being movable from said biased position by a coin to permit said power means to operate and move said signal into signalling position, said member being arranged to effect movement of said coin into said signal during the operation of moving said signal into signalling position, and said member having means for holding said control means out of said biased position until said signal reaches signalling position.

9. The organization described in claim 8, wherein said control means is movable from said biased position by a second coin, and means are provided for removing the first mentioned coin from said signal during the operation removing said signal out of signalling position.

10. In a parking meter, a signal, driving means for moving said signal into signalling and non-signalling positions, control means biased to a position to prevent operation of said driving means, said control means being movable from said biased position by a coin to permit operation of said driving means, said driving means and said control means having cooperating parts operable upon initial movement of said driving means to keep said control means out of said biased position until said signal reaches signalling or non-signalling position, whereby said driving means is stopped by movement of said control means into said biased position, said control means being thereafter movable from said biased position to again permit operation of said driving means, timing means initiatable by movement of said signal into signalling position, and means actuatable by said timing means to move said control means out of biased position upon the expiration of a predetermined period of time.

11. In a parking meter, a signal, driving means for moving said signal into signalling and non-signalling positions, control means biased to a position to prevent operation of said driving means, said control means being movable from said biased position by a coin to permit operation of said driving means, said driving means and said control means having cooperating parts operable upon initial movement of said driving means to keep said control means out of said biased position until said signal reaches signalling or non-signalling position, whereby said driving means is stopped by movement of said control means into said biased position, said control means being thereafter movable from said biased position to again permit operation of said driving means, and said driving means including means for moving the coin with the signal into signalling position where said coin is observable.

12. In a parking meter, a signal, driving means for moving said signal into signalling and non-signalling positions, control means biased to a position to prevent operation of said driving means, said control means being movable from said biased position by a coin to permit operation of said driving means, said driving means and said control means having cooperating parts operable upon initial movement of said driving means to keep said control means out of said biased position until said signal reaches signalling or non-signalling position, whereby said driving means is stopped by movement of said control means into said biased position, said control means being thereafter movable from said biased position to again permit operation of said driving means, said driving means including means for moving the coin with the signal into signalling position, a receptacle, and means for depositing the coin in said receptacle when said driving means operates to move the signal out of signalling position.

13. In a parking meter, a signal, driving means for moving said signal into signalling and non-signalling positions, control means biased to a position to prevent operation of said driving means, said control means being movable from said biased position by a coin to permit operation of said driving means, said driving means and said control means having cooperating parts operable upon initial movement of said driving means to keep said control means out of said biased position until said signal reaches signalling or non-signalling position, whereby said driving means is stopped by movement of said control means into said biased position, said control means being thereafter movable from said biased position to again permit operation of said driving means, said signal being provided with a recess for receiving a coin for observation during a signalling period, said driving means including means for moving the coin into said recess during an operation moving said signal into signalling position, and means for removing the coin from said recess during an operation moving said signal into non-signalling position.

14. In a parking meter, a signal device, power means for conditioning said signal device for signalling and non-signalling purposes, a timing element, control means associated with said power means actuatable by a coin to permit said power means to condition said signal device for signalling purpose and initiate operation of said timing element, said timing element having means operable upon the expiration of a predetermined period of time to cause said control means to permit said power means to condition said signal device for non-signalling purpose, said power means being provided with means operable when the signal device is conditioned for non-signalling purpose to reset said timing element preparatory to initiation of a new timing period, and said control means being actuatable by a second coin during a timing period to permit said power means to reset said timing element and initiate a new timing period.

HARRY L. LONG.
HERMAN S. JOHNS.